United States Patent [19]
McDonald

[11] Patent Number: 5,808,780
[45] Date of Patent: Sep. 15, 1998

[54] NON-CONTACTING MICROMECHANICAL OPTICAL SWITCH

[75] Inventor: Terrance Gus McDonald, Plano, Tex.

[73] Assignee: Texas Instruments Incorporated, Dallas, Tex.

[21] Appl. No.: 871,308

[22] Filed: Jun. 9, 1997

[51] Int. Cl.$^6$ .................................................. G02B 26/00
[52] U.S. Cl. ........................ 359/290; 359/292; 359/295; 359/245; 359/318; 310/328; 310/366
[58] Field of Search .................................. 359/318, 290, 359/291, 292, 295, 221, 224, 230, 245; 310/328, 333, 365, 366

[56] References Cited

U.S. PATENT DOCUMENTS

| | | | |
|---|---|---|---|
| 4,675,500 | 6/1987 | Kunz et al. ............................ | 359/290 |
| 4,954,789 | 9/1990 | Sampsell ............................... | 359/318 |
| 5,475,525 | 12/1995 | Tournois et al. ...................... | 359/245 |
| 5,508,841 | 4/1996 | Lin et al. ............................... | 359/318 |
| 5,535,047 | 7/1996 | Hornbeck .............................. | 359/295 |

Primary Examiner—Loha Ben
Attorney, Agent, or Firm—Julie L. Reed; James C. Kesterson; Richard L. Donaldson

[57] ABSTRACT

A micromechanical optical switch (30). A reflective surface with two angled reflective surfaces (32,34) positioned opposite a micromechanical device (12). The micromechanical device is positioned such that light input along a path (36) to a first (32) of the two angled reflective surfaces is reflected to the micromechanical device. The micromechanical device then reflects the light to the second (34) of the angled surfaces to be output along another path (38a, 38b). The path (38a, 38b) that the second angled surface (34) outputs the light along is selected depending upon the position of the micromechanical device's reflective member (14). The reflective member (14) deflects from at least one hinge (22) to one of several positions. The number of positions available to the reflective member (14) depends upon the voltage applied to the electrodes (27a, 27b, 27c, 27d). The reflective member (14) makes no contact with any other surfaces, and thereby always returns to a know position upon loss of power.

20 Claims, 2 Drawing Sheets

5,808,780

NON-CONTACTING MICROMECHANICAL OPTICAL SWITCH

BACKGROUND OF THE INVENTION

1. Field of the Invention

This invention relates to optical switching, more particularly to micromechanical optical switches.

2. Background of the Invention

Micromechanical devices have certain advantages in the optical switching area. They are compact, have fast response times and can achieve stable states which allow them to switch light in consistent directions. However, depending upon the states assumed by the micromechanical element of the switch, it can leave the optical system in an unknown state at loss of power.

One example of these type of devices is shown in U.S. Pat. No. 5,226,099. In this patent a micromechanical device referred to as a digital micromirror device or deformable mirror device is adapted to include a small vertical flap off the mirror. When the mirror deflects, the small vertical flap slides into a slit in a waveguide, thereby switching the light OFF.

This type of device has an advantage in that it can achieve one of three stable states: deflected to one side; deflected to the other side; or undeflected (flat). The mirror achieves a stable state when deflected because it comes into contact with a landing electrode. However, a disadvantage of this landing is that when power is lost, there is no way of determining quickly what state the structure is in. It could be in any one of the three states.

Another type of micromechanical device that has a known state upon loss of power is shown in U.S. Pat. No. 4,954,789. This type of device comprises a mirrored surface suspended over an activating electrode by four hinges. When the electrode is activated, the mirror moves down in a piston-like motion towards the electrode, due to electrostatic attraction. The voltage on the electrode are controlled such that the mirror is deflected to a stable, known state each time. When power is lost, the attractive forces between the electrode and the mirror cease to exist and the mirror returns to its undeflected state.

However, a disadvantage of this type of non-contacting element is that it can only achieve two positions, deflected or undeflected. This limits its applicability as an optical routing switch. Therefore, an optical switch is needed that can achieve more than one stable state, yet returns to a known state upon loss of power.

SUMMARY OF THE INVENTION

One aspect of the invention is a micromechanical device which acts as an optical switch. The device comprises of a reflective member suspended over at least one activation electrode such that when the electrode or electrodes are activated, the member deflects towards the electrode but does not make contact.

The device is positioned directly opposite a surface that has two reflective surfaces. Incoming light is reflected by the first surface to the reflective member. Depending upon the position of the reflective member, it directs light to one of several points on the second reflective surface, which then reflects the light into an outgoing optical fiber or waveguide. The position of the reflective member is controlled by the voltage on the electrode or electrodes. The electrode can be segmented to allow for fine-tuning of the position of the reflected light.

It is an advantage of the invention in that it allows multiple input and output paths for optical switching.

It is a further advantage of the invention in that it does not make contact with any surfaces and thereby always returns to a known state upon loss of power.

It is a further advantage of the invention in that it allows for fine-tuning of the reflective member's position to provide maximum optical throughput.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1A:
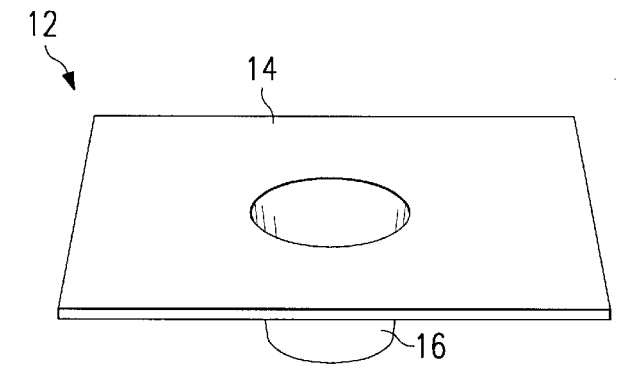
FIGS. 1a–1b show a prior art embodiment of a micromechanical device.
Figure 1A:
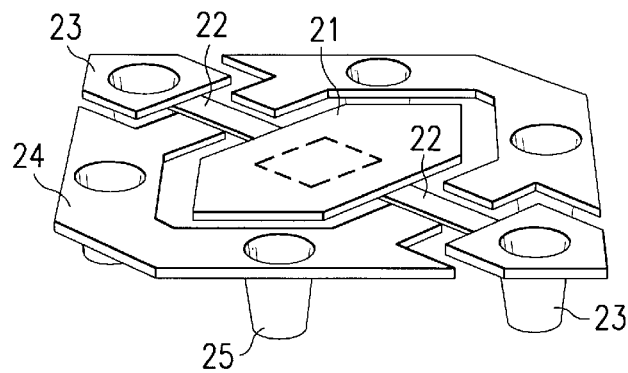

One example of a prior art, contacting micromechanical device is shown in FIG. 1a. The reflective member 14 is supported by a post 16. The post 16 in turn rests upon an active yoke 21. Yoke 21 is supported by hinges 22, which are supported by posts 23. Post 25 support landing surface 24. Underneath the landing surface and yoke lies the control circuitry for the device. When the electrodes 27 are activated, the yoke 21 is attracted to them and rotates about the hinges 22 until the yoke 21 comes into contact with the lower landing surface 26. As the yoke 21 deflects, the reflective member 14 also deflects and touches down onto landing surface. 24. The yoke 21 can go to either side, allowing two stable deflected positions, and one stable undeflected or flat position.

The problems with using this type of device for optical switching lies in its contacting of other surfaces. When it makes contact, the position is stable. If power is lost, it is uncertain whether or not enough sticking forces have accrued that would cause the yoke 21 to remain deflected. In some situations, depending upon the operating environment of the device, it may remain deflected or it may return to it undeflected state. There is no way of determining the actual position of the switch in a loss of power situation, short of visual inspection or testing after power has been regained.

Figure 1B:
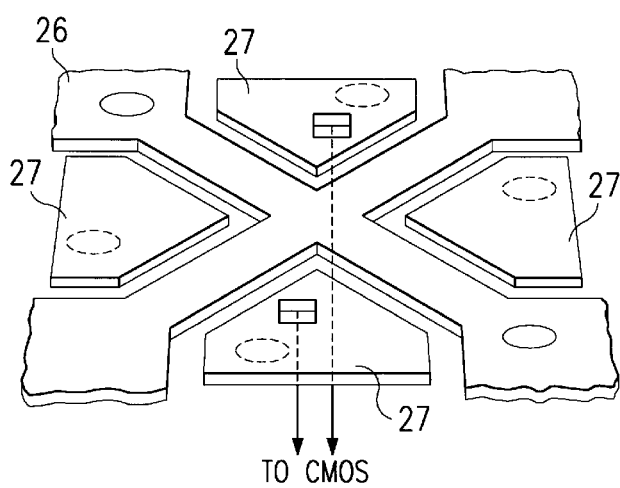
Figure 1B:
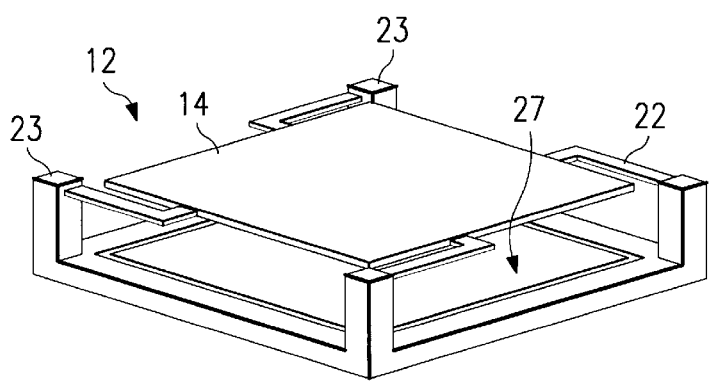

An example of a micromechanical device 12 that returns to a known state upon loss of power is shown in FIG. 1b. The mirror or reflective surface 14 is suspended by four flexure hinges 22 and posts 23 over an electrode 27. When the electrode 27 is activated, the mirror deflects towards the electrode until it reaches the limits of the hinges 22. This causes the mirror to assume a stable state. Since there is no contact between the mirror and the electrodes or any other surface, no other forces except electrostatic attraction come into play. When power is lost, and the electrostatic forces dissipate, the mirror returns to it undeflected position. While the device is shown as being supported by four hinges, it could be supported by as few as one or as many as desired, so long as the mirror returns to a known position upon loss of power. The term digital micromirror device is often used to refer to these type of devices as well, even though they can be operated in an analog fashion, with the depth of deflection being determined by the amount of voltage applied.

However, this switch only has two states, deflected or undeflected. It is not very useful in a crossbar or routing switch embodiment. The control circuitry and the electrodes can be adapted to allow finer control of the mirror's stable deflected states.

Figure 2:
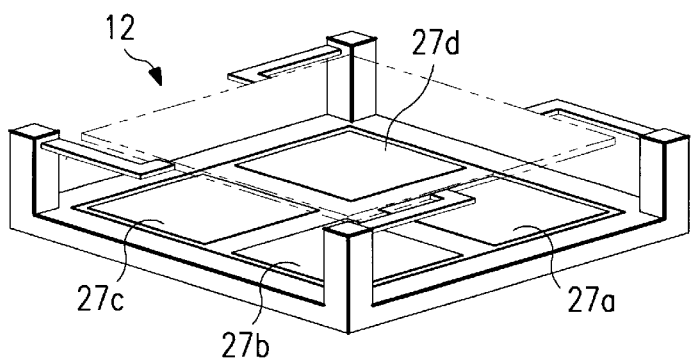
FIG. 2 shows a prior art embodiment of a non-contacting micromechanical device.

One example of a device used in this invention is shown in FIG. 2. The mirror 14 has been cut away from the device and is represented by the dashed lines. The electrode 27 has been divided or segmented into four electrodes 27a–27d. These electrodes are activated with a known analog voltage. The different levels of voltage available in the analog domain determine which of several deflected states the member assumes. Once a known analog voltage is applied, the segmented electrodes allow fine-tuning of the member's position.

For example; the reflective member may be deflected to a position corresponding to 5 volts being applied to the electrodes. In order to fine tune the position of the reflected light, the voltage on electrode 1 may be adjusted to 4.8 volts, electrode 2 to 5.1 volts, and electrode 3 to 5.2 volts, with electrode 4 remaining at 5 volts. The nonuniform field underneath the member is small enough that the member will not change its depth, but some slight torqueing of its surface will occur. This torqueing of the surface is what causes the position of the reflected light to be positioned in a slightly different place.

Figure 3A:
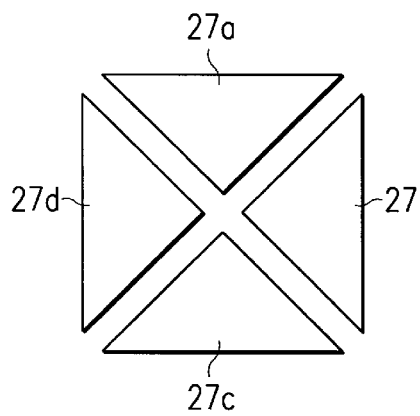
FIGS. 3a–3c show alternated embodiments of activating electrodes for a non-contacting micromechanical device.
Figure 3B:
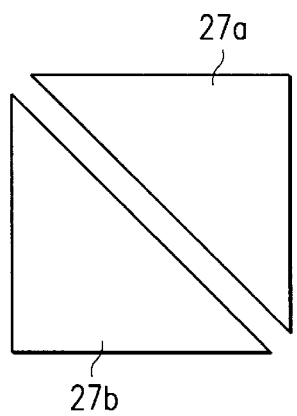
Figure 3C:
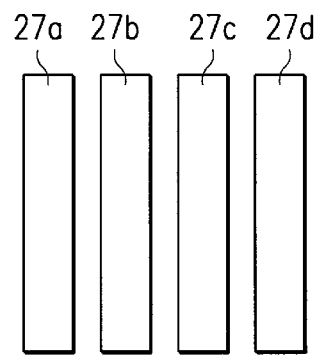

Alternate embodiments of the segmented electrodes are shown in FIGS. 3a–3b. The electrodes could be patterned as four triangles as shown in FIG. 3a, which may have an advantage of increasing surface area. Instead of patterning four electrodes, only two electrodes could be used as shown in FIG. 3b. These two electrodes are shown as triangular, but could be rectangular as well. Finally, four strip electrodes are shown in FIG. 3c.

Figure 4:
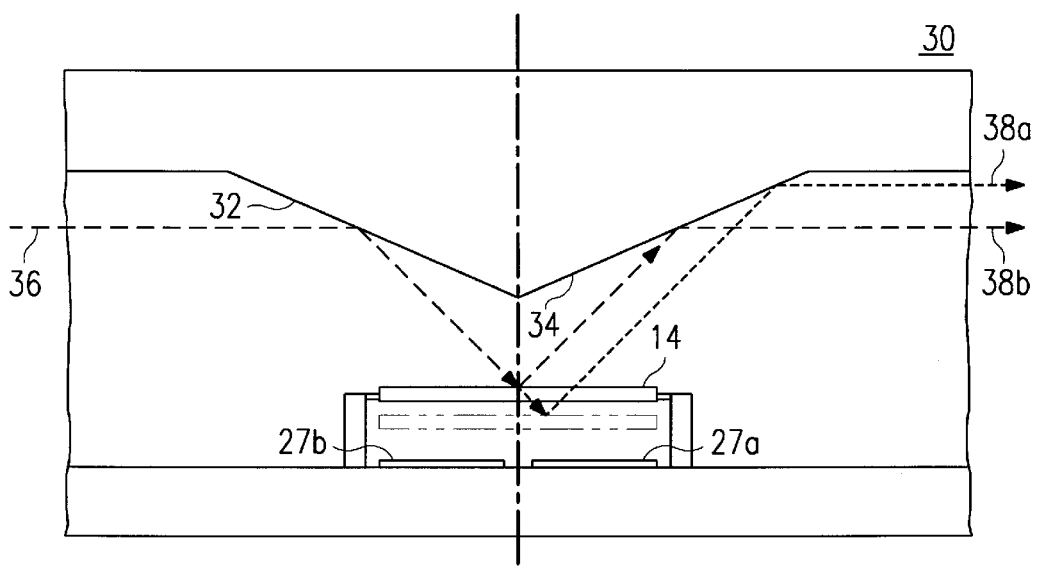
FIG. 4 shows one embodiment of an optical switch using a non-contacting micromechanical in conjunction with an oppositely positioned reflective surface.

One embodiment of an optical switch 30 using a non-contacting micromechanical device is shown in FIG. 4. Opposite the non-contacting micromechanical device is a reflective surface that has two angled surfaces 32 and 34. The incoming light along path 36 reflects down to the reflective member or mirror 14. If the mirror 14 is in its undeflected position, shown with the solid lines, the light is reflected back up to the angled reflective surface 34 and output along path 38b. If the mirror is in a deflected position, shown by the dashed lines, the light is reflected back up to the angled reflective surface 34 and output along path 38a. Again, the voltages on each electrode could be adjusted to maximize the amount of light in path 38a that enters an output fiber or waveguide.

The embodiment shown has a mirror with only two stable positions indicated. However, the electrodes 27a–d of FIG. 3a could allow a third stable position. For example, the position of mirror 14 shown by the dashed line could be due to a different voltage being applied. There could be a third state, lower than that state shown by the dashed line, where the applied voltage is higher. That position would lie between the solid line position and the dashed line position of mirror 14.

Finally, the embodiment shown shows only one input light path. If fibers were vertically stacked coming into the switch, it could have two light paths passing light onto reflective surface 32. The light could then be switched for one path or the other or both into one of four output paths for the two positions shown, or one of six output paths if there were a third position.

In this manner, the use of grazing angles increases the possible input and output configurations of the non-contacting micromechanical optical switch. This increases its usefulness while allowing the switch to continue to return to a known position upon loss of power.

While the above embodiments discuss structures which may be interpreted as limited to those referred to a digital micromirror devices, this in no way is intended to limit this invention to those structures. Any micromechanical device which allows deflection of a reflective member upon activation of electrodes, such that the member returns to a known position may be used.

Thus, although there has been described to this point a particular embodiment for a method and structure for a micromechanical optical switch, it is not intended that such specific references be considered as limitations upon the scope of this invention except in-so-far as set forth in the following claims.

What is claimed is:

1. A micromechanical optical switch, comprising:
   a reflective surface having two angled reflective surfaces;
   a micromechanical device, comprising:
      a reflective member, supported by at least one hinge;
      at least one electrode underneath said member, such that when said electrode is activated, said member deflects towards said electrode, but does not contact any surface; and
   said micromechanical device positioned opposite said reflective surface such that light impinging upon a first of said angled reflective surfaces directs light to said reflective member of said micromechanical device and a second of said angled reflective surfaces receives light from said micromechanical device, wherein said second angled reflective surface receives light at a position dependent upon the deflection of said reflective member.

2. The micromechanical optical switch of claim 1 wherein said reflective member is supported by four hinges.

3. The micromechanical optical switch of claim 1 wherein said at least one electrode further comprises two electrodes.

4. The micromechanical optical switch of claim 3 wherein the voltage on each electrode is adjusted to fine tune said position of said reflected light.

5. The micromechanical optical switch of claim 3 wherein said electrodes are triangular.

6. The micromechanical optical switch of claim 3 wherein said electrodes are rectangular.

7. The micromechanical optical switch of claim 1 wherein said at least one electrode further comprises four electrodes.

8. The micromechanical optical switch of claim 7 wherein the voltage on each electrode is adjusted to fine tune said position of said reflected light.

9. The micromechanical optical switch of claim 7 wherein said electrodes are triangular.

10. The micromechanical optical switch of claim 7 wherein said electrodes are rectangular.

11. A micromechanical optical switch, comprising:
    a reflective surface having two angled reflective surfaces;
    a micromechanical device, comprising:
       a reflective member, supported by at least one hinge;
       at least one post, supported said at least one hinge over an air gap; and
       at least one electrode underneath said air gap, such that when said electrode is activated, said member deflects upon said hinge towards said electrode, but does not contact any surface; and said micromechanical device positioned opposite said reflective surfaces such that light impinging upon a first of said angled reflective surfaces directs light to said reflective member of said micromechanical device and a second of said angled reflective surfaces receives light from said micromechanical device, wherein said second angled reflective surface receives light at a position dependent upon the deflection of said reflective member.

12. The micromechanical optical switch of claim 11 wherein said reflective member is supported by four hinges.

13. The micromechanical optical switch of claim 11 wherein said at least one electrode further comprises two electrodes.

14. The micromechanical optical switch of claim 13 wherein said electrodes are triangular.

15. The micromechanical optical switch of claim 13 wherein said electrodes are rectangular.

16. The micromechanical optical switch of claim 13 wherein voltage applied to each electrode is adjusted to fine tune said position of said reflected light.

17. The micromechanical optical switch of claim 11 wherein said at least one electrode further comprises four electrodes.

18. The micromechanical optical switch of claim 17 wherein voltage applied to each electrode is adjusted to fine tune said position of said reflected light.

19. The micromechanical optical switch of claim 17 wherein said electrodes are triangular.

20. The micromechanical optical switch of claim 17 wherein said electrodes are rectangular.

* * * * *